US011805435B2

(12) United States Patent
Manolakos

(10) Patent No.: US 11,805,435 B2
(45) Date of Patent: Oct. 31, 2023

(54) DERIVING CSI USING A SUBSET OF CONFIGURED CSI-RS RESOURCES

(71) Applicant: QUALCOMM Incorporated, San Diego, CA (US)

(72) Inventor: Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/001,249

(22) Filed: Aug. 24, 2020

(65) Prior Publication Data

US 2021/0076243 A1    Mar. 11, 2021

(30) Foreign Application Priority Data

Sep. 6, 2019    (GR) ............................... 20190100385

(51) Int. Cl.
*H04W 24/10*        (2009.01)
*H04W 24/08*        (2009.01)
(Continued)

(52) U.S. Cl.
CPC .......... *H04W 24/10* (2013.01); *H04B 7/0626* (2013.01); *H04L 5/0007* (2013.01);
(Continued)

(58) Field of Classification Search
CPC . H04W 24/10; H04W 24/08; H04W 72/0446; H04W 72/048; H04B 7/0626;
(Continued)

(56) References Cited

U.S. PATENT DOCUMENTS

2013/0208710 A1* 8/2013 Seo ....................... H04L 5/0057
                                                                 370/336
2014/0078919 A1    3/2014 Hammarwall
(Continued)

OTHER PUBLICATIONS

Ericsson : "Maintenance for CSI Acquisition", 3GPP Draft, 3GPP TSG-RAN WG1 Meeting #94bis, R1-1811192, Maintenance for CSI Acquisition, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518593, 10 pages, Retrieved from the Internet : URL: http://www.3gpp.org/ftp/tsg%5Fran/WG1%5FRL1/TSGR1%5F94b/Docs/R1%2D1811192%2Ezip. [retrieved on Sep. 29, 2018] p. 4-pp. 4-9.

(Continued)

*Primary Examiner* — Chirag G Shah
*Assistant Examiner* — Joshua Smith
(74) *Attorney, Agent, or Firm* — Harrity & Harrity, LLP

(57) ABSTRACT

A user equipment (UE) may receive a configuration that indicates a set of channel state information reference signals (CSI-RSs) to be measured by the UE for deriving channel state information (CSI), one or more time domain resources for which the UE is to derive the CSI, and a time domain resource for transmission of a CSI report that includes the CSI, wherein the one or more time domain resources for which the UE is to derive the CSI occur after the time domain resource for transmission of the CSI report; determine that the UE cannot measure a first subset of CSI-RSs included in the set of CSI-RSs; derive one or more parameters for the CSI report based at least in part on measuring a second subset of CSI-RSs included in the set of CSI-RSs; and transmit the CSI report in the time domain resource for transmission of the CSI report.

30 Claims, 8 Drawing Sheets

(51) Int. Cl.
  *H04L 5/00* (2006.01)
  *H04B 7/06* (2006.01)
  *H04W 72/0446* (2023.01)
  *H04L 41/0803* (2022.01)
  *H04W 72/51* (2023.01)

(52) U.S. Cl.
  CPC ........ *H04L 5/0048* (2013.01); *H04L 41/0803* (2013.01); *H04W 24/08* (2013.01); *H04W 72/0446* (2013.01); *H04W 72/51* (2023.01)

(58) Field of Classification Search
  CPC . H04L 5/0007; H04L 5/0048; H04L 41/0803; H04L 25/023; H04L 5/0057; H04L 5/0051
  See application file for complete search history.

(56) References Cited

U.S. PATENT DOCUMENTS

| | | | |
|---|---|---|---|
| 2015/0215928 A1* | 7/2015 | Davydov | H04B 7/0626 370/329 |
| 2015/0327106 A1* | 11/2015 | Lee | H04W 24/10 370/252 |
| 2016/0198024 A1* | 7/2016 | Yu | H04L 5/14 370/312 |
| 2017/0250781 A1* | 8/2017 | Golitschek Edler Von Elbwart | H04B 7/0632 |
| 2017/0331645 A1* | 11/2017 | Baugh | H04L 5/0051 |
| 2019/0165846 A1 | 5/2019 | Kim et al. | |
| 2019/0313324 A1* | 10/2019 | Dalsgaard | H04L 5/0082 |
| 2020/0007213 A1* | 1/2020 | Kakishima | H04B 7/0626 |
| 2020/0112359 A1* | 4/2020 | Park | H04L 5/023 |
| 2020/0374967 A1* | 11/2020 | Nogami | H04W 72/0446 |
| 2020/0412506 A1* | 12/2020 | Määttanen | H04L 5/0051 |
| 2021/0076445 A1* | 3/2021 | Tsai | H04L 5/003 |
| 2021/0099271 A1* | 4/2021 | Zhang | H04W 24/10 |
| 2021/0391906 A1* | 12/2021 | Oteri | H04W 74/0808 |

OTHER PUBLICATIONS

Nokia Alcatel-Lucent Shanghai Bell: "Motivation for New study Item on Multi Antenna Enhancements for NR", 3GPP Draft, 3GPP TSG-RAN Meeting #76, RP-171171, 3rd Generation Partnership Project (3GPP), Mobile Competence Centre, 650, Route Des Lucioles, F-06921 Sophia-Antipolis Cedex, France, vol. RAN, No. West Palm Beach, U.S.A, Jun. 6, 2017-Jun. 8, 2017, May 29, 2017 (May 29, 2017), XP051665598,18 pages, Retrieved from the Pages Internet: URL: http://www.3gpp.org/ftp/tsg%5Fran/TSG%5FRAN/TSGR%5F76/Docs/RP%2D171171%2Ezip, pp. 1-18.

Ericsson : "Maintenance for CSI Acquisition", 3GPP Draft, 3GPP TSG-RAN WG1 Meeting #94bis, R1-1811192, Maintenance for CSI Acquisition, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518593, 10 pages, Retrieved from the Internet: URL: http://www.3gpp.org/ftp/tsg%5Fran/WG1%5FRL1/TSGR1%5F94b/Docs/R1%2D1811192%2Ezip. [retrieved on Sep. 29, 2018] p. 4-p. 5 figure 1.

International Search Report and Written Opinion—PCT/US2020/070458—ISA/EPO—dated Nov. 17, 2020.

LG Electronics: "Consideration on UE Processing Relaxation", 3GPP Draft, 3GPP TSG RAN WG1 Meeting #70bis, R1-124318, 3rd Generation Partnership Project (3GPP), Mobile Competence Centre, 650, Route Des Lucioles, F-06921 Sophia-Antipolis Cedex, France, vol. RAN WG1, No. San Diego. USA, Oct. 8, 2012-Oct. 12, 2012, Sep. 29, 2012 (Sep. 29, 2012), XP050662218, 5 pages, Retrieved from the Internet: URL: http://www.3gpp.org/ftp/tsg_ran/WG1_RL1/TSGR1_70b/Docs/. [retrieved on Sep. 29, 2012] p. 2 figure 1.

Nokia Alcatel-Lucent Shanghai Bell: "Motivation for New Study Item on Multi Antenna Enhancements for NR", 3GPP Draft, 3GPP TSG-RAN Meeting #76, RP-171171, 3rd Generation Partnership Project (3GPP), Mobile Competence Centre, 650, Route Des Lucioles, F-06921 Sophia-Antipolis Cedex, France, vol. RAN, No. West Palm Beach, U.S.A, Jun. 6, 2017-Jun. 8, 2017, May 29, 2017 (May 29, 2017), XP051665598, 18 pages, Retrieved from the Internet : URL: http://www.3gpp.org/ftp/tsg%5Fran/TSG%5FRAN/TSGR%5F76/Docs/RP%2D171171%2Ezip. [retrieved on May 29, 2017] p. 11.

* cited by examiner

DERIVING CSI USING A SUBSET OF CONFIGURED CSI-RS RESOURCES

CROSS-REFERENCE TO RELATED APPLICATION

This patent application claims priority to Greece Patent Application No. 20190100385, filed on Sep. 6, 2019, entitled "DERIVING CSI USING A SUBSET OF CONFIGURED CSI-RS RESOURCES," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for deriving channel state information (CSI) using a subset of configured CSI reference signal (CSI-RS) resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication performed by a user equipment (UE) includes: receiving a configuration that indicates a set of channel state information reference signals (CSI-RSs) to be measured by the UE for deriving channel state information (CSI), one or more time domain resources for which the UE is to derive the CSI, and a time domain resource for transmission of a CSI report that includes the CSI, wherein the one or more time domain resources for which the UE is to derive the CSI occur after the time domain resource for transmission of the CSI report; determining that the UE cannot measure a first subset of CSI-RSs included in the set of CSI-RSs; deriving one or more parameters for the CSI report based at least in part on measuring a second subset of CSI-RSs included in the set of CSI-RSs, wherein the second subset of CSI-RSs excludes the first subset of CSI-RSs; and transmitting the CSI report, including the one or more parameters, in the time domain resource for transmission of the CSI report.

In some aspects, a user equipment (UE) for wireless communication includes: memory; one or more processors coupled to the memory; and instructions stored in the memory and operable, when executed by the one or more processors, to cause the UE to: receive a configuration that indicates a set of CSI-RSs to be measured by the UE for deriving CSI, one or more time domain resources for which the UE is to derive the CSI, and a time domain resource for transmission of a CSI report that includes the CSI, wherein the one or more time domain resources for which the UE is to derive the CSI occur after the time domain resource for transmission of the CSI report; determine that the UE cannot measure a first subset of CSI-RSs included in the set of CSI-RSs; derive one or more parameters for the CSI report based at least in part on measuring a second subset of CSI-RSs included in the set of CSI-RSs, wherein the second subset of CSI-RSs excludes the first subset of CSI-RSs; and transmit the CSI report, including the one or more parameters, in the time domain resource for transmission of the CSI report.

In some aspects, a non-transitory computer-readable medium stores one or more instructions for wireless communication that, when executed by one or more processors of a UE, cause the UE to: receive a configuration that indicates a set of CSI-RSs be measured by the UE for deriving CSI, one or more time domain resources for which the UE is to derive the CSI, and a time domain resource for transmission of a CSI report that includes the CSI, wherein the one or more time domain resources for which the UE is to derive the CSI occur after the time domain resource for transmission of the CSI report; determine that the UE cannot measure a first subset of CSI-RSs included in the set of CSI-RSs; derive one or more parameters for the CSI report based at least in part on measuring a second subset of CSI-RSs included in the set of CSI-RSs, wherein the second subset of CSI-RSs excludes the first subset of CSI-RSs; and transmit the CSI report, including the one or more parameters, in the time domain resource for transmission of the CSI report.

In some aspects, an apparatus for wireless communication includes: means for receiving a configuration that indicates a set of CSI-RSs to be measured by the apparatus for deriving CSI, one or more time domain resources for which the apparatus is to derive the CSI, and a time domain resource for transmission of a CSI report that includes the CSI, wherein the one or more time domain resources for which the apparatus is to derive the CSI occur after the time domain resource for transmission of the CSI report; means for determining that the apparatus cannot measure a first subset of CSI-RSs included in the set of CSI-RSs; means for deriving one or more parameters for the CSI report based at least in part on measuring a second subset of CSI-RSs included in the set of CSI-RSs, wherein the second subset of CSI-RSs excludes the first subset of CSI-RSs; and means for transmitting the CSI report, including the one or more parameters, in the time domain resource for transmission of the CSI report.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
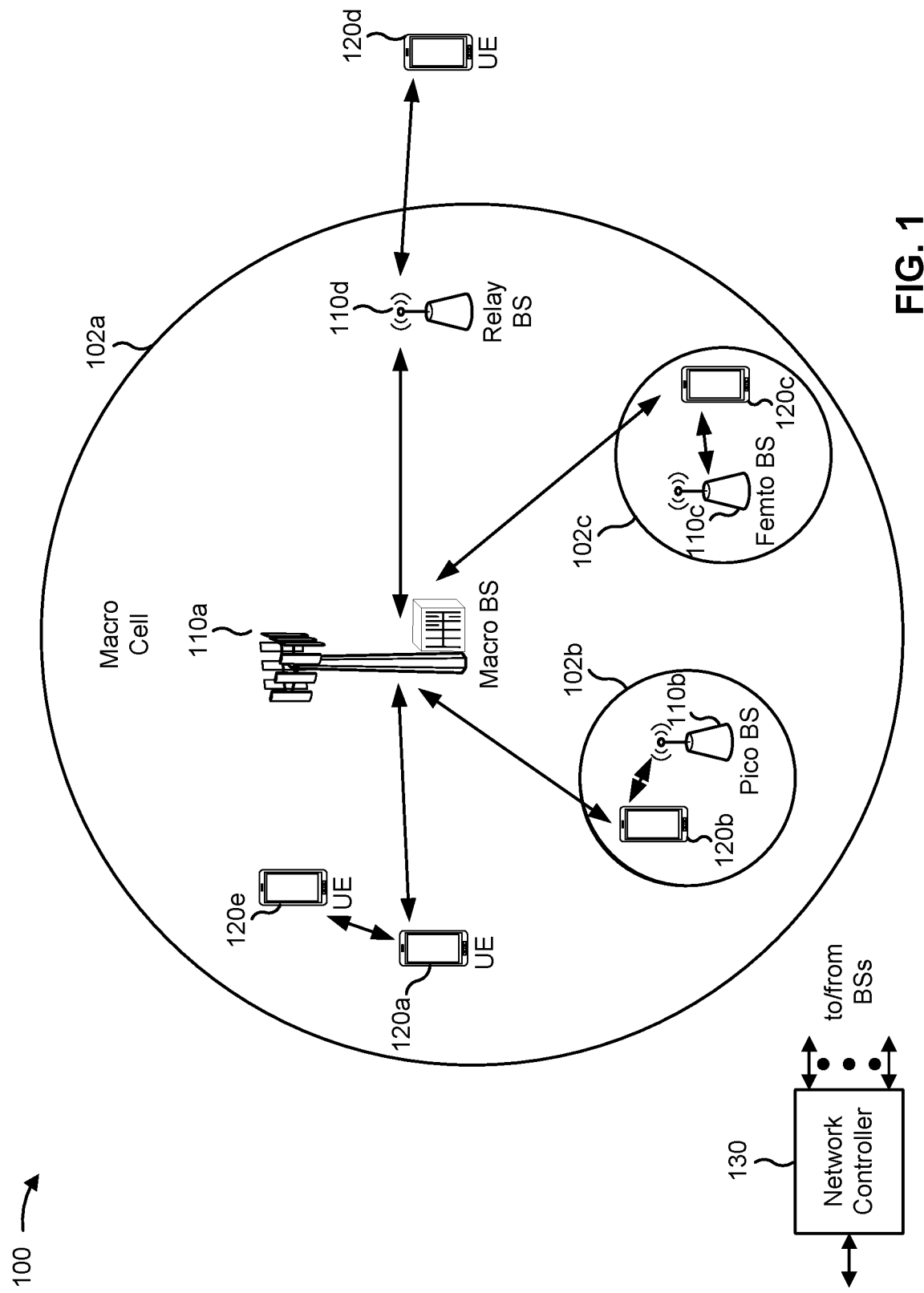
FIG. 1 is a diagram illustrating an example of a wireless communication network, in accordance with various aspects of the present disclosure.

To provide a channel state information (CSI) report that is not outdated, a user equipment (UE) may extrapolate (e.g., estimate, derive, and/or the like) future channel conditions using a set of CSI reference signals (CSI-RSs) that occur prior to a CSI reference resource. This may be referred to as extrapolation-based CSI reporting, an extrapolated CSI report, and/or the like. This may permit a base station to select better transmission parameters for a data transmission as compared to using outdated CSI. However, in some cases, the UE may not be able to measure all configured CSI-RSs and/or may not be able to use all of the configured CSI-RSs to derive CSI parameters. In these cases, rather than transmit the CSI report, the UE may be configured to drop the CSI report. However, if the UE is able to measure a subset of the configured CSI-RSs, then dropping the CSI report may lead to sub-optimal selection of transmission parameters by the base station as compared to extrapolating CSI parameters using a subset of the configured CSI-RSs. Some techniques and apparatuses described herein improve selection of transmission parameter by the base station by permitting the UE to extrapolate or derive CSI parameters for a CSI report using a subset of configured CSI-RSs in a CSI reference resource interval.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
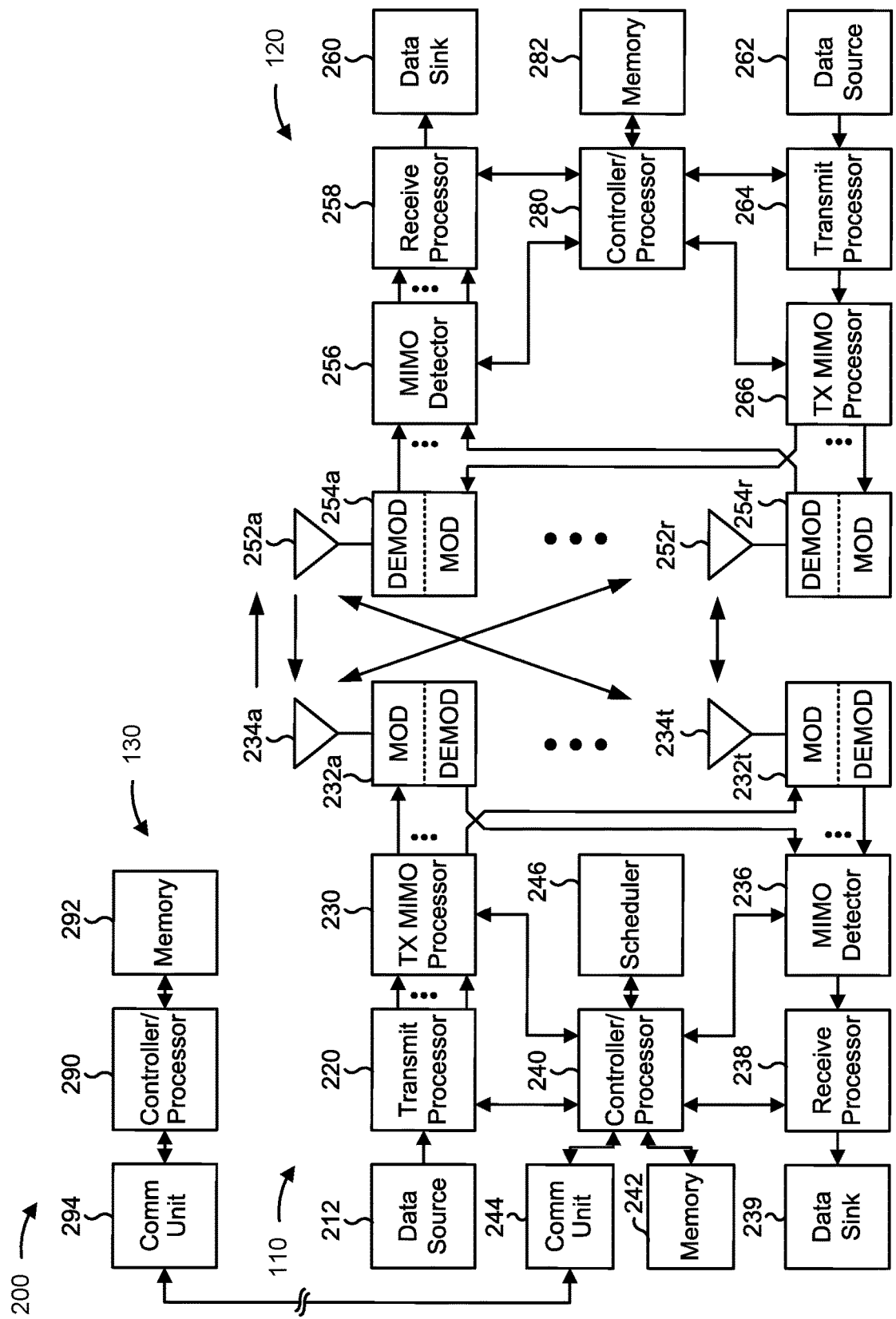
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with deriving channel state information (CSI) using a subset of configured CSI reference signal (CSI-RS) resources, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

Figure 8:
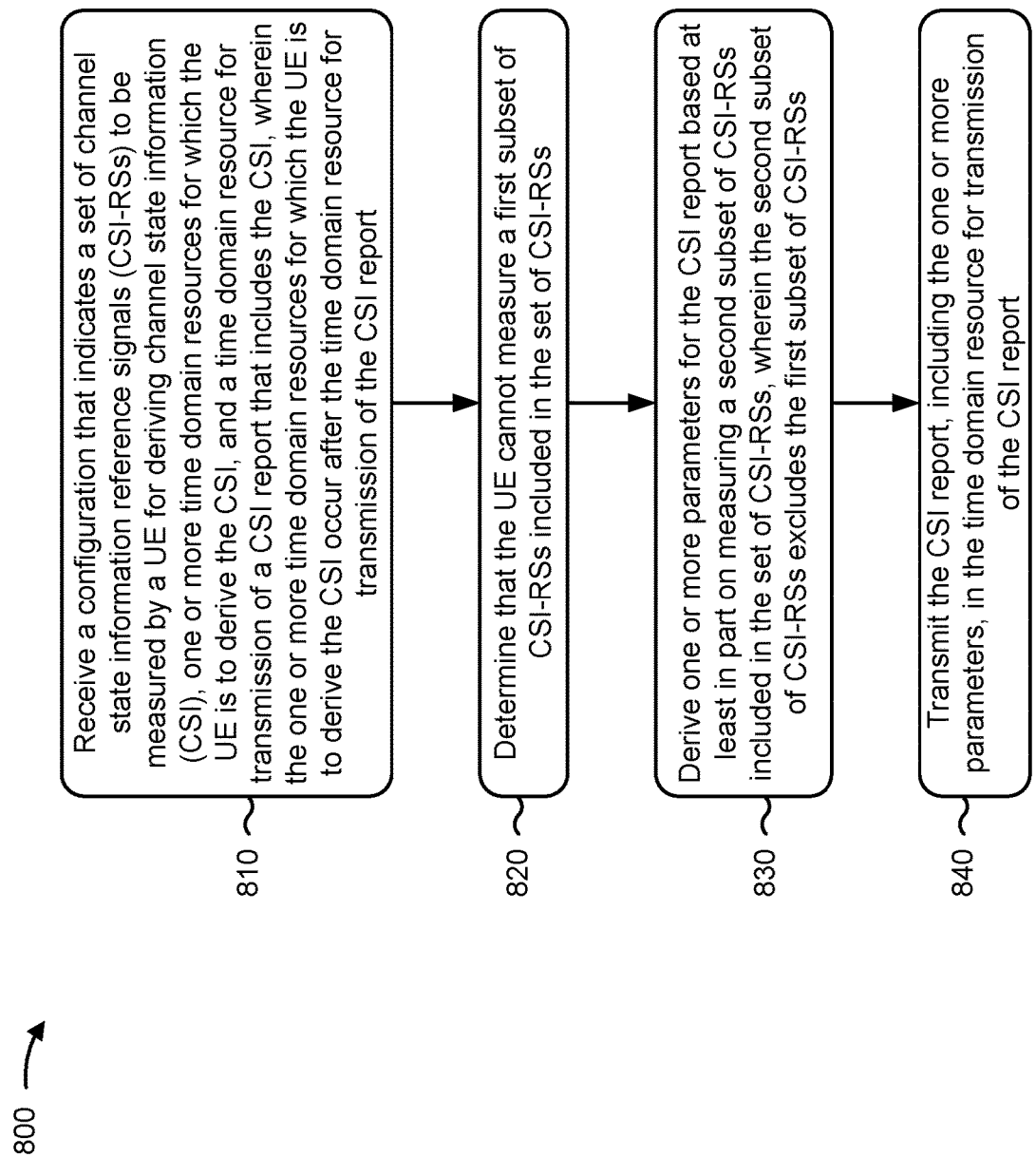
FIG. 8 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 800 of FIG. 8 and/or other processes as described herein. A scheduler 246 may schedule UEs for data transmission on the downlink and/or uplink.

In some aspects, UE 120 may include means for receiving a configuration that indicates a set of channel state information reference signals (CSI-RSs) to be measured by the UE for deriving channel state information (CSI), one or more time domain resources (e.g., one or more slots) for which the UE is to derive the CSI, and a time domain resource (e.g., a slot) for transmission of a CSI report that includes the CSI, wherein the one or more time domain resources (e.g., the one or more slots) for which the UE is to derive the CSI occur after the time domain resource (e.g., the slot) for transmission of the CSI report; means for determining that the UE cannot measure a first subset of CSI-RSs included in the set of CSI-RSs; means for deriving one or more parameters for the CSI report based at least in part on measuring a second subset of CSI-RSs included in the set of CSI-RSs, wherein the second subset of CSI-RSs excludes the first subset of CSI-RSs; means for transmitting the CSI report, including the one or more parameters, in the time domain resource (e.g., the slot) for transmission of the CSI report; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
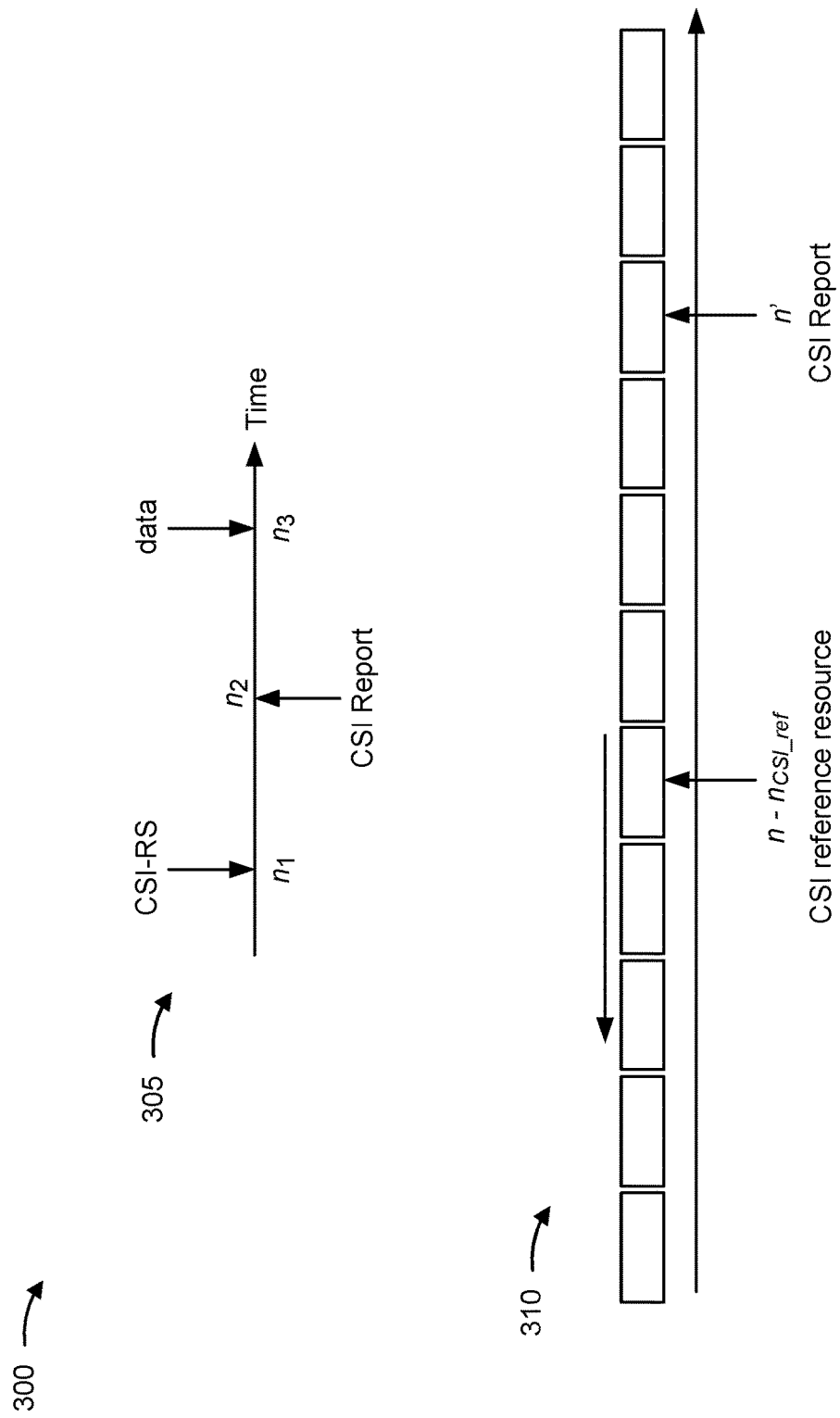
FIG. 3 is a diagram illustrating an example of channel state information (CSI) reporting, in accordance with various aspects of the present disclosure.

FIG. 3 is a diagram illustrating an example 300 of CSI reporting, in accordance with various aspects of the present disclosure.

As shown by reference number 305, a UE may measure one or more CSI-RSs transmitted by a base station at a first time $n_1$ (e.g., in a first slot or time domain resource), the UE may transmit a CSI report to the base station based at least in part on those measurements at a second time $n_2$ (e.g., in a second slot or time domain resource) after processing the one or more CSI-RSs, and the base station may transmit data to the UE based at least in part on the CSI report at a third time $n_3$ (e.g., in a third slot or time domain resource). The CSI-RS measurements at time $n_1$ may indicate channel conditions at time $n_1$. However, the channel conditions at time $n_3$, when the base station transmits data based at least in part on the CSI report of the CSI-RS measurements, may be different from the channel conditions at time $n_1$. This may be referred to as channel aging. As a result, the base station may select sub-optimal transmission parameters for transmission of the data at time $n_3$. Such transmission parameters may include, for example, a modulation and coding scheme (MCS), a rank, a precoder, a beam, a multiple input multiple output (MIMO) layer, and/or the like. This may result in a missed communication if channel conditions have degraded between time $n_1$ and time $n_3$, or may result in under-utilization of network resources if channel conditions have improved between time $n_1$ and time $n_3$.

As shown by reference number 310, a UE may transmit a CSI report in a CSI reporting slot n'. The CSI report may be based at least in part on a CSI reference resource that occurs in a slot prior to transmission of the CSI report. In the time domain, the CSI reference resource for CSI reporting in uplink slot n' may be defined by a downlink slot $n\text{-}n_{CSI\_ref}$ as shown, where n depends on n' and the subcarrier spacing configurations for downlink and uplink, and where $n_{CSI\_ref}$ is a valid downlink slot that depends on various factors such as whether CSI reporting is periodic, aperiodic, or semi-persistent. The UE uses one or more CSI-RSs that are received no later than the CSI reference resource (e.g., that are received in or before the CSI reference resource) to derive parameters for the CSI report. Thus, the CSI report represents channel conditions in or prior to the CSI reference resource. However, due to channel aging described above, the CSI report is outdated, and a subsequent data transmission by a base station that occurs after the CSI report is configured according to outdated channel conditions, as described above.

To provide a CSI report that is not outdated, a UE may extrapolate (e.g., estimate, derive, and/or the like) future channel conditions using a set of CSI-RSs that occur prior to the CSI reference resource, as described in more detail below in connection with FIG. 4. This may be referred to as extrapolation-based CSI reporting, an extrapolated CSI report, and/or the like. In this way, the base station may select better transmission parameters for a data transmission as compared to using outdated CSI.

As indicated above, FIG. 3 is provided merely as an example. Other examples may differ from what is described with regard to FIG. 3.

Figure 4:
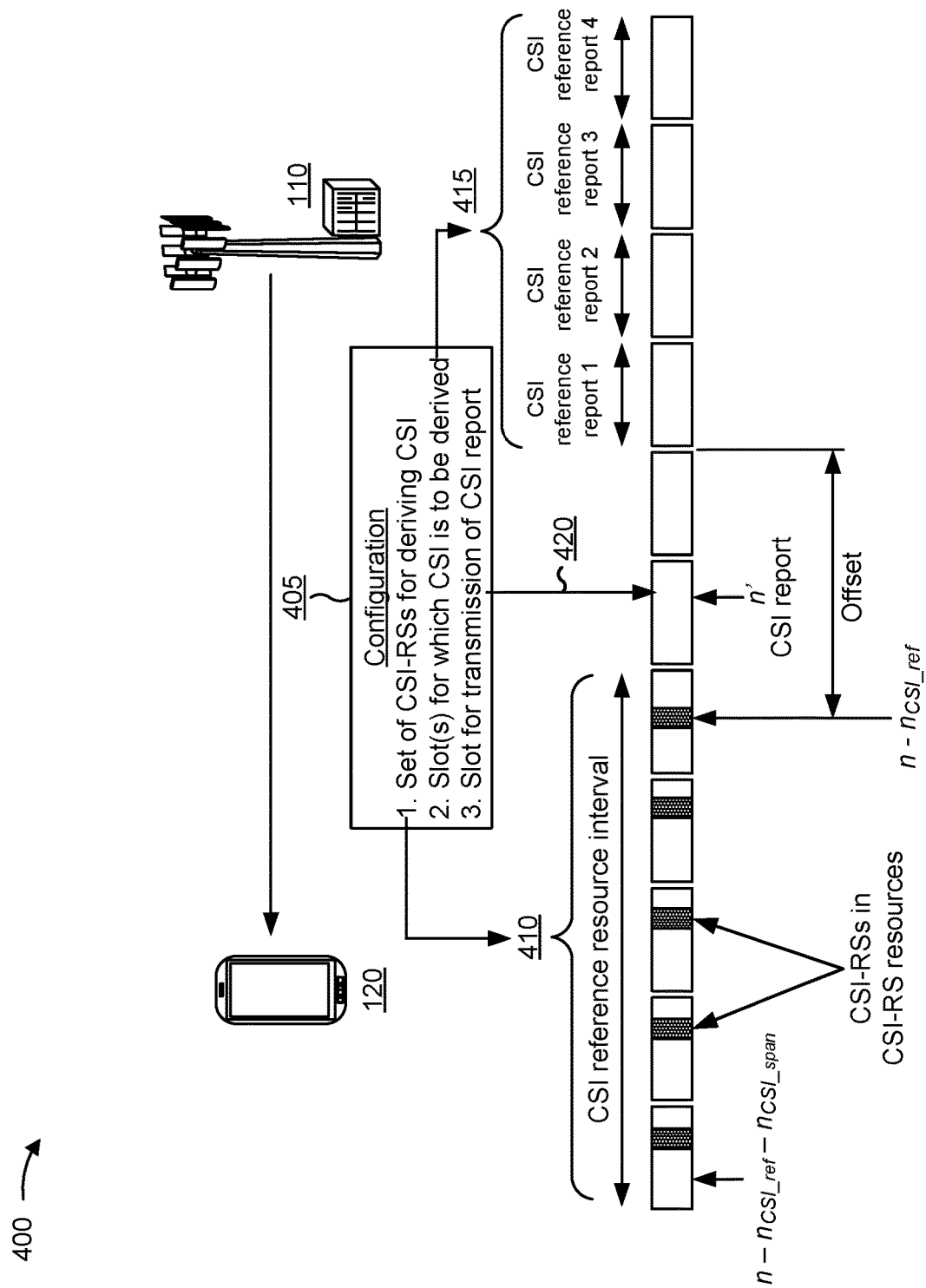
FIG. 4 is a diagram illustrating an example of extrapolation-based CSI reporting, in accordance with various aspects of the present disclosure.

FIG. 4 is a diagram illustrating an example 400 of extrapolation-based CSI reporting, in accordance with various aspects of the present disclosure. As shown in FIG. 4, a UE 120 and a base station 110 may communicate with one another.

As shown by reference number 405, the base station 110 may transmit, to the UE 120, a configuration for CSI reporting. The configuration may be for an extrapolated CSI report, where the UE 120 uses a set of CSI-RSs to derive CSI parameters for one or more slots that occur later in time than the set of CSI-RSs and/or that occur later in time than the slot used to transmit the CSI report. In some aspects, the configuration may be indicated in a radio resource control (RRC) message, such as an RRC configuration message, an RRC reconfiguration message, and/or the like. Although some aspects are described herein as being performed in connection with CSI-RS, these aspects may also apply to CSI for interference management (CSI-IM).

As shown by reference number 410, the configuration may indicate a set of CSI-RSs to be measured by the UE 120 to derive CSI. As shown, the set of CSI-RSs may occur in a set of CSI-RS resources within a CSI reference resource interval. The CSI reference resource interval may include multiple transmission time intervals (TTIs) (e.g., slots or other time domain resources). For example, the CSI reference resource interval may span a number of slots starting with a slot shown as $n\text{-}n_{CSI\_ref}\text{-}n_{CSI\_span}$ and ending with a slot shown as $n\text{-}n_{CSI\_ref}$. The slot $n\text{-}n_{CSI\_ref}$ is described above in connection with FIG. 3, and the slot $n\text{-}n_{CSI\_ref}\text{-}n_{CSI\_span}$ may occur $n_{CSI\_span}$ slots before the slot $n\text{-}n_{CSI\_ref}$, where $n_{CSI\_span}$ represents the length of the CSI reference resource interval. In example 400, the CSI reference resource interval is five slots in length.

In some aspects, the set of CSI-RSs to be measured by the UE 120 spans across multiple non-adjacent symbols associated with a single CSI-RS transmission occasion. For example, the UE 120 may be configured with a single CSI-RS resource that includes multiple symbols (e.g., non-adjacent symbols). The non-adjacent symbols may occur in the CSI reference resource interval, as shown. Alternatively, the set of CSI-RSs to be measured by the UE 120 includes multiple one-symbol CSI-RS transmission occasions that occur in non-adjacent symbols. For example, the UE 120 may be configured with multiple CSI-RS resources (e.g., multiple CSI-RS transmission occasions) that each occur within a single symbol. The symbols may be non-adjacent and may occur in the CSI reference resource interval, as shown. In example 400, the UE 120 may be configured with a single CSI-RS that includes five non-adjacent symbols, or may be configured with five CSI-RS resources that occur in non-adjacent symbols.

As shown by reference number 415, the configuration may indicate one or more slots for which the UE 120 is to derive the CSI, shown as CSI reference report slots. As shown, these slots occur after the CSI reference resource interval (e.g., after the set of CSI-RSs to be measured by the UE 120) and after the slot in which the CSI report is transmitted. In example 400, there are four CSI reference report slots, and the UE 120 uses the CSI-RSs measured in the CSI reference resource interval to extrapolate and/or derive CSI parameters for the four CSI reference report slots.

As shown by reference number 420, the configuration may indicate a slot for transmission of a CSI report that includes the CSI. In example 400, this slot is shown as slot n', and is described above in connection with FIG. 3. In some aspects, the UE 120 may be configured with and/or may determine an offset (e.g., a slot offset, a symbol offset, and/or the like) between the CSI reference resource interval and a CSI reference report. For example, the offset may represent an offset between the latest-occurring CSI-RS (e.g., within the CSI reference resource interval) and the earliest-occurring CSI reference report slot for which CSI parameters are to be derived using the set of CSI-RSs.

To provide a CSI report that is not outdated, the UE 120 may extrapolate (e.g., estimate, derive, and/or the like) future channel conditions using a set of CSI-RSs that occur in the CSI reference resource interval. For example, the UE 120 may use the set of CSI-RSs in the CSI reference resource interval to extrapolate CSI parameters for the CSI reference report slots (e.g., by measuring a change in channel conditions over time). The UE 120 may report the extrapolated CSI parameters in the CSI report. Example CSI parameters include a channel quality indicator (CQI) parameter, a precoding matrix indicator (PMI) parameter, a CSI-RS resource indicator (CRI) parameter, a strongest layer indication (SLI) parameter, a rank indication (RI) parameter, a layer 1 (L1) reference signal received power (RSRP) (L1-RSRP) parameter, a layer 1 (L1) signal-to-interference-plus-noise ratio (SINR) (L1-SINR) parameter, and/or the like. In this way, the base station 110 may select better transmission parameters for a data transmission as compared to using outdated CSI.

However, in some cases, the UE 120 may not be able to measure all of the configured CSI-RSs and/or may not be able to use all of the configured CSI-RSs to derive CSI parameters for the CSI reference report slots. For example, a CSI-RS may occur too late in time as compared to a corresponding CSI reference report slot (e.g., may occur with too small an offset) to permit the UE 120 to process the CSI-RS. As other examples, the UE 120 may not be able to measure all of the configured CSI-RSs due to being in a discontinuous reception (DRX) sleep state during the CSI reference resource interval, performing a bandwidth part (BWP) switch during the CSI reference resource interval, undergoing serving cell activation during the CSI reference resource interval, receiving a reconfiguration of a CSI report, receiving an indication to activate CSI reporting (e.g., semi-persistent CSI reporting and/or the like), reconfiguration of a CSI-RS slot to an uplink slot, and/or the like.

In these cases, rather than transmit the CSI report, the UE 120 may be configured to drop the CSI report (e.g., by refraining from transmitting the CSI report). However, if the UE 120 is able to measure a subset of the configured CSI-RSs, then dropping the CSI report may lead to sub-optimal selection of transmission parameters by the base station 110 as compared to extrapolating CSI parameters using a subset of the configured CSI-RSs. Some techniques and apparatuses described herein improve selection of transmission parameters by the base station 110 by permitting the UE 120 to extrapolate or derive CSI parameters for a CSI report using a subset of configured CSI-RSs in a CSI reference resource interval.

As indicated above, FIG. 4 is provided merely as an example. Other examples may differ from what is described with regard to FIG. 4.

Figure 5:
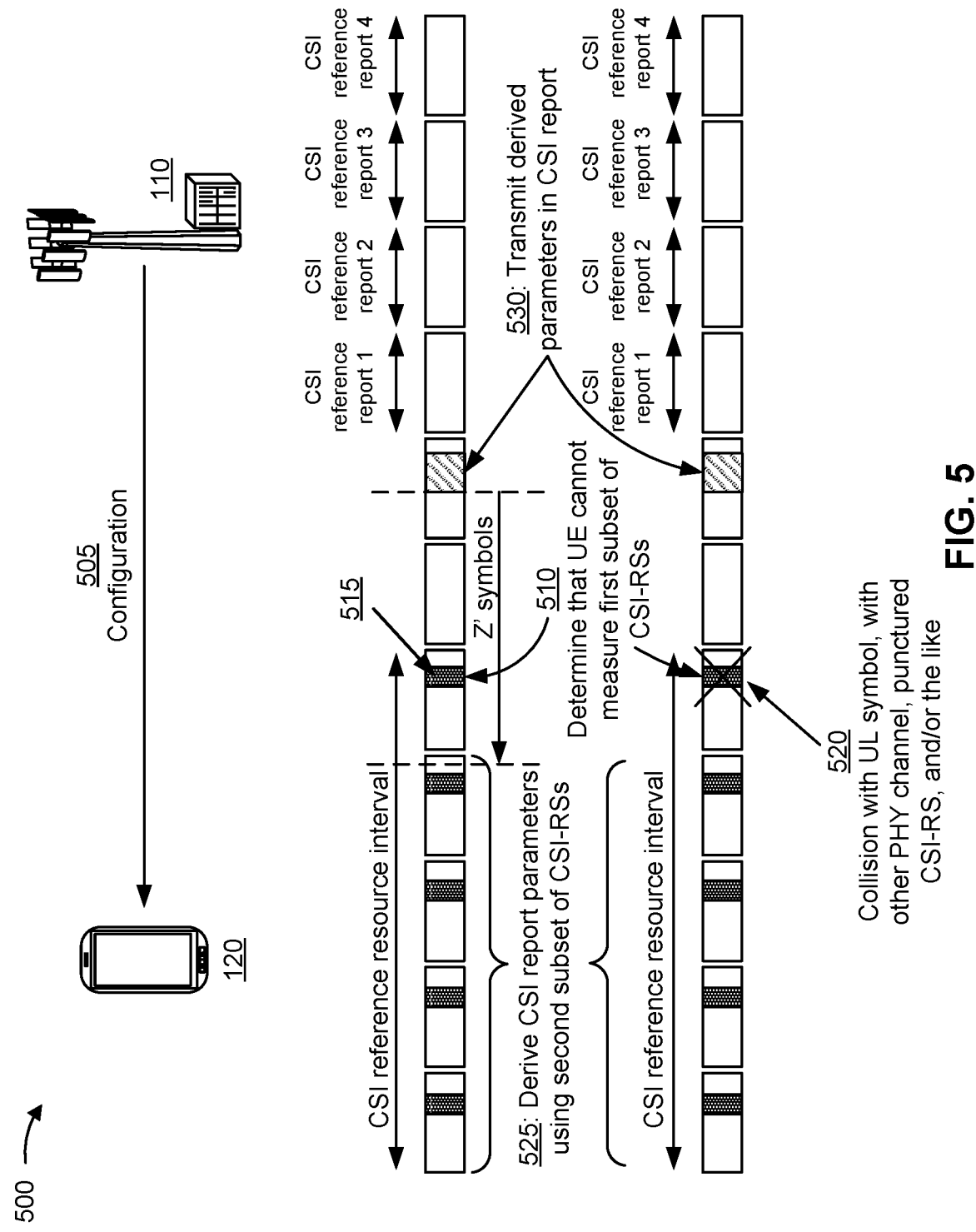
FIGS. 5-7 are diagrams illustrating examples of deriving CSI using a subset of configured CSI reference signal (CSI-RS) resources, in accordance with various aspects of the present disclosure.

FIG. 5 is a diagram illustrating an example 500 of deriving CSI using a subset of configured CSI-RS resources, in accordance with various aspects of the present disclosure. As shown in FIG. 5, a UE 120 and a base station 110 may communicate with one another.

As shown by reference number 505, the base station 110 may transmit, to the UE 120, a configuration for CSI reporting, as described above in connection with FIG. 4. The configuration may be for an extrapolated CSI report, where the UE 120 uses a set of CSI-RSs to derive CSI parameters for one or more slots that occur later in time than the set of CSI-RSs and/or that occur later in time than the slot used to transmit the CSI report. In some aspects, the configuration may be indicated in an RRC message, such as an RRC configuration message, an RRC reconfiguration message, and/or the like. As described above in connection with FIG. 4, the configuration may indicate a set of CSI-RSs to be measured by the UE 120 (e.g., in a CSI reference resource interval) for deriving CSI, one or more slots (e.g., one or more CSI reference report slots) for which the UE 120 is to derive the CSI, and a slot for transmission of a CSI report that includes the CSI. As described above in connection with FIG. 4, the one or more slots for which the UE 120 is to derive the CSI may occur after the slot for transmission of the CSI report. Although some techniques are described herein in connection with slots, these techniques may be applied for other time domain resources, such as subframes, mini-slots, symbols, sets of symbols, and/or the like, which may be consecutive or non-consecutive.

As shown by reference number 510, the UE 120 may determine that the UE 120 cannot measure a first subset of CSI-RSs (e.g., one or more CSI-RSs) included in the configured set of CSI-RSs. For example, the UE 120 may be unable to measure the first subset of CSI-RSs due to a timing of the first subset of CSI-RSs relative to the slot for transmission of the CSI report. For example, the UE 120 may be unable to measure the first subset of CSI-RSs because the first subset of CSI-RSs occurs too late in time to be included in the CSI report. For example, the UE 120 may not be expected to measure a CSI-RS if the last symbol (e.g., OFDM symbol) of the CSI-RS is received less than a threshold number of symbols (shown as Z' symbols) before a transmission time of the first symbol (e.g., the first OFDM symbol) of the CSI report. As shown by reference number 515, one of the configured CSI-RSs occurs too late in time compared to the CSI report, and thus the UE 120 cannot use this CSI-RS to determine a CSI parameter to be included in the CSI report (e.g., due to insufficient processing time).

Additionally, or alternatively, as shown by reference number 520, the UE 120 may be unable to measure the first subset of CSI-RSs because a set of symbols in which the first subset of CSI-RSs occurs are reconfigured to uplink symbols and/or are otherwise modified such that the CSI-RSs do not occur in the set of symbols or transmission of the CSI-RSs in the set of symbols would result in a collision with another communication. For example, a CSI-RS symbol may be reconfigured to an uplink symbol (e.g., causing an uplink collision), may be reconfigured to carry transmissions for another physical (PHY) channel, may be punctured, and/or the like.

Additionally, or alternatively, the UE 120 may not be able to measure the first subset of CSI-RSs because the UE 120 is undergoing a BWP switch when the first subset of CSI-RSs occurs, as described in more detail below in connection with FIG. 6. Additionally, or alternatively, the UE 120 may not be able to measure the first subset of CSI-RSs because the UE 120 is in a DRX sleep state when the first subset of CSI-RSs occurs, as described in more detail below in connection with FIG. 7. Additionally, or alternatively, the UE 120 may not be able to measure the first subset of CSI-RSs because the UE 120 is undergoing serving cell activation when the first subset of CSI-RSs occurs, because the UE 120 has received a configuration or a reconfiguration of a CSI report after the first subset of CSI-RSs occurs, because the UE 120 has received an indication to activate CSI reporting (e.g., semi-persistent CSI reporting and/or the like) after the first subset of CSI-RSs occur, and/or the like.

As shown by reference number 525, the UE 120 may derive one or more parameters for the CSI report (e.g., one or more CSI parameters) based at least in part on measuring a second subset of CSI-RSs included in the set of CSI-RSs. The second subset of CSI-RSs measured by the UE 120 excludes the first subset of CSI-RSs that cannot be measured by the UE 120. In example 500, the UE 120 uses the first four out of five configured CSI-RSs to derive the one or more CSI parameters, and excludes the fifth (e.g., latest-occurring) configured CSI-RS from being used for the derivation.

In some aspects, the UE 120 may derive the one or more parameters for the CSI report based at least in part on a determination that the second subset of CSI-RSs (e.g., capable of being measured by the UE 120 for the extrapolated CSI report) includes a threshold number of CSI-RSs. In some aspects, the threshold number may be two or may be at least two because the UE 120 may need to measure at least two CSI-RSs to extrapolate a change in channel conditions over time. Additionally, or alternatively, the threshold number may be based at least in part on a UE capability. For example, different UEs 120 may have different capabilities for extrapolating CSI parameters from CSI-RSs, with some UEs 120 requiring fewer CSI-RSs to perform extrapolation and some UEs 120 requiring more CSI-RSs to perform extrapolation. In some aspects, the threshold number may be configured for the UE 120 by the base station 110 (e.g., in an RRC message). For example, the base station 110 may require a certain degree of accuracy for CSI parameter extrapolation, and the degree of accuracy may depend on the number of CSI-RSs used to perform the extrapolation.

As described above in connection with FIG. 4, in some aspects, the configured set of CSI-RSs may span across multiple non-adjacent symbols associated with a single CSI-RS transmission occasion. In this case, the threshold number may represent a threshold number of non-adjacent symbols (e.g., at least two non-adjacent symbols that each carry a CSI-RS). Thus, the threshold number may represent a minimum number of OFDM symbols (e.g., non-adjacent or non-consecutive OFDM symbols) that include CSI-RSs. Furthermore, in this case, the UE 120 may determine that the threshold number is satisfied if the second set of CSI-RSs includes CSI-RSs in the threshold number of non-adjacent symbols.

Alternatively, as also described above in connection with FIG. 4, the configured set of CSI-RSs may include multiple one-symbol CSI-RS transmission occasions that occur in non-adjacent symbols. In this case, the threshold number may represent a threshold number of one-symbol CSI-RS transmission occasions (e.g., at least two one-symbol CSI-RS transmission occasions). Thus, the threshold number may represent a minimum number of CSI-RS resources. Furthermore, in this case, the UE 120 may determine that the threshold number is satisfied if the second set of CSI-RSs includes CSI-RSs in the threshold number of one-symbol CSI-RS transmission occasions.

As shown by reference number 530, the UE 120 may transmit the CSI report, including the one or more CSI parameters, in the slot for transmission of the CSI report. In some aspects, the UE 120 may transmit the CSI report based at least in part on a determination that the second subset of CSI-RSs include a threshold number of CSI-RSs, in a similar manner as described above. In this case, if the second subset of CSI-RSs includes the threshold number of CSI-RSs, then the UE 120 may transmit the CSI report. Conversely, if the second subset of CSI-RSs does not include the threshold number of CSI-RSs, then the UE 120 may drop the CSI report (e.g., may refrain from transmitting the CSI report). Alternatively, if the second subset of CSI-RSs does not include the threshold number of CSI-RSs, then the UE 120 may refrain from updating the CSI report (e.g., may transmit a dummy CSI report or a default CSI report, may retransmit a most recently transmitted CSI report, may transmit CSI parameters from the most recently transmitted CSI report, and/or the like).

By using a subset of the configured CSI-RSs to extrapolate CSI parameters for a CSI report rather than dropping the CSI report, the UE 120 may be able to improve selection of transmission parameters by the base station 110.

As indicated above, FIG. 5 is provided merely as an example. Other examples may differ from what is described with regard to FIG. 5.

Figure 6:
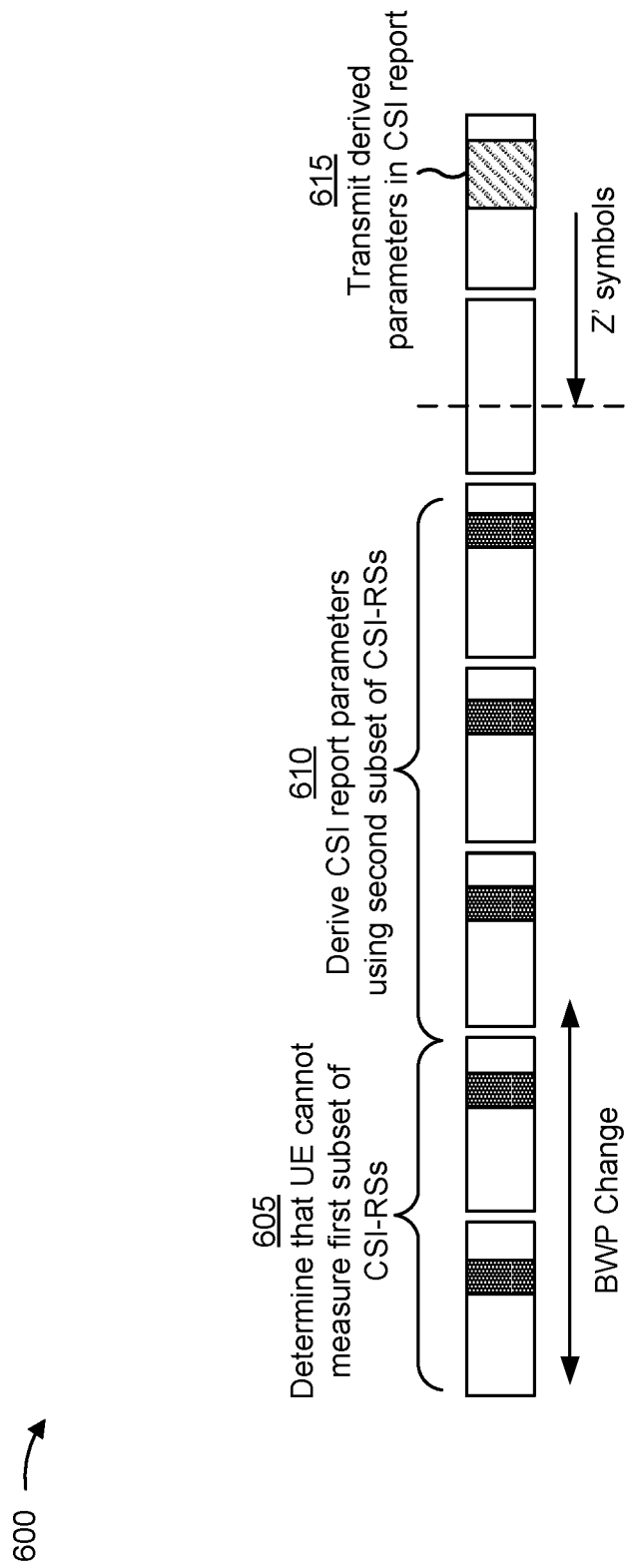

FIG. 6 is a diagram illustrating an example 600 of deriving CSI using a subset of configured CSI-RS resources, in accordance with various aspects of the present disclosure.

As shown by reference number 605, a UE 120 may determine that the UE 120 cannot measure a first subset of CSI-RSs included in a configured set of CSI-RSs, as described above in connection with FIG. 5. In example 600, the UE 120 is undergoing BWP switching (e.g., a BWP change) during the CSI reference resource interval (e.g., during a portion of the CSI reference resource interval). As a result, the UE 120 cannot measure the first two CSI-RSs of a set of five CSI-RSs configured for a BWP to which the UE 120 switches.

In example 600, the UE 120 determines that the UE 120 cannot measure the first subset of CSI-RSs based at least in part on detecting the change in BWP. However, in some aspects, the UE 120 may determine that the UE 120 cannot measure the first subset of CSI-RSs based at least in part on detecting a CSI report configuration, a CSI report reconfiguration, a serving cell activation, an activation of CSI (e.g., semi-persistent CSI), and/or the like.

As shown by reference number 610, the UE 120 may derive one or more CSI parameters for the CSI report based at least in part on measuring a second subset of CSI-RSs included in the configured set of CSI-RSs, in a similar manner as described above in connection with FIG. 5. In example 600, the UE 120 completes the BWP switch and measures the last three CSI-RSs of the set of five CSI-RSs configured for the BWP to which the UE 120 switches.

As shown by reference number 615, the UE 120 may transmit the CSI report, including the one or more derived CSI parameters, in a slot for transmission of the CSI report, in a similar manner as described above in connection with FIG. 5. In some aspects, the UE 120 may transmit the CSI report based at least in part on a determination that the second subset of CSI-RSs include a threshold number of CSI-RSs (e.g., at least two CSI-RSs, at least three CSI-RSs, or the like), in a similar manner as described above. Additionally, or alternatively, the UE 120 may transmit the CSI report based at least in part on a determination that the second subset of CSI-RSs includes a threshold number of CSI-RSs that are received within a CSI reference resource interval associated with the CSI report (e.g., at least Z' symbols before transmission of the CSI report). In this way, the UE 120 may be able to improve selection of transmission parameters by the base station 110.

As indicated above, FIG. 6 is provided merely as an example. Other examples may differ from what is described with regard to FIG. 6.

Figure 7:
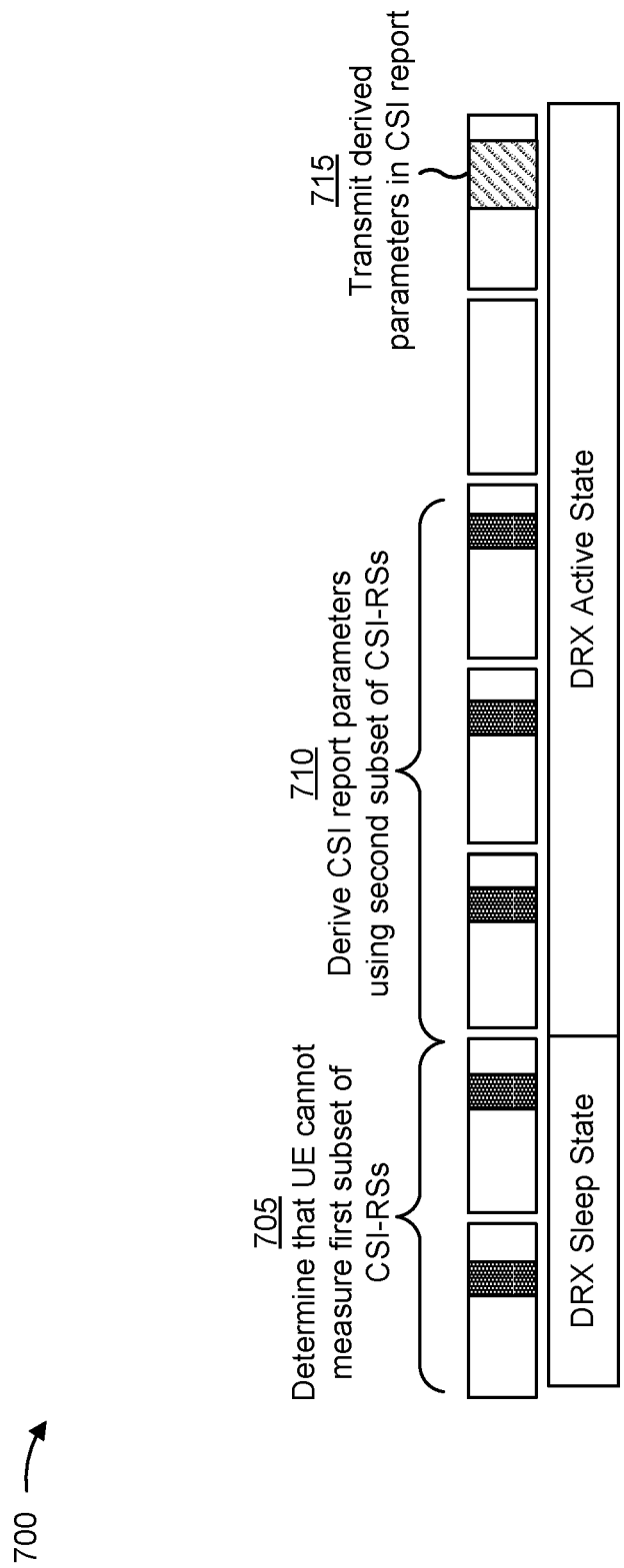

FIG. 7 is a diagram illustrating an example 700 of deriving CSI using a subset of configured CSI-RS resources, in accordance with various aspects of the present disclosure.

As shown by reference number 705, a UE 120 may determine that the UE 120 cannot measure a first subset of CSI-RSs included in a configured set of CSI-RSs, as described above in connection with FIG. 5. In example 700, the UE 120 is in a DRX sleep state during the CSI reference resource interval (e.g., during a portion of the CSI reference resource interval). As a result, the UE 120 cannot measure the first two CSI-RSs of a set of five CSI-RSs configured for the UE 120.

As shown by reference number 710, the UE 120 may derive one or more CSI parameters for the CSI report based at least in part on measuring a second subset of CSI-RSs included in the configured set of CSI-RSs, in a similar manner as described above in connection with FIG. 5. In example 700, the UE 120 exits the DRX sleep state, enters a DRX active state, and measures the last three CSI-RSs of the set of five CSI-RSs during the DRX active state.

As shown by reference number 715, the UE 120 may transmit the CSI report, including the one or more derived CSI parameters, in a slot for transmission of the CSI report, in a similar manner as described above in connection with FIG. 5. In some aspects, the UE 120 may transmit the CSI report based at least in part on a determination that the second subset of CSI-RSs include a threshold number of CSI-RSs (e.g., at least two CSI-RSs, at least three CSI-RSs, or the like), in a similar manner as described above. Additionally, or alternatively, the UE 120 may transmit the CSI report based at least in part on a determination that the second subset of CSI-RSs includes a threshold number of CSI-RSs that are received during a DRX active time within a CSI reference resource interval associated with the CSI report (e.g., at least Z' symbols before transmission of the CSI report). In this way, the UE 120 may be able to improve selection of transmission parameters by the base station 110.

Additionally, or alternatively, the UE 120 may transmit the CSI report based at least in part on a determination that the second subset of CSI-RSs includes a threshold number of latest-occurring CSI-RSs (e.g., of the configured set of CSI-RSs) that occur during a DRX active time. For example, if the UE 120 is in the DRX active state for a set of earlier-occurring CSI-RSs of the configured set of CSI-RSs and then enters the DRX sleep state for a set of later-occurring CSI-RSs of the configured set of CSI-RSs, then the UE 120 may refrain from transmitting the CSI report. In this case, the UE 120 may be in the DRX sleep state during scheduled transmission of the CSI report and/or may not have the latest channel information (as indicated by the later-occurring CSI-RSs), and so may drop the CSI report. In this case, the UE 120 may refrain from measuring the earlier-occurring CSI-RSs to conserve UE resources (e.g., processing resources, memory resources, battery power, and/or the like).

As indicated above, FIG. 7 is provided merely as an example. Other examples may differ from what is described with regard to FIG. 7.

FIG. 8 is a diagram illustrating an example process 800 performed, for example, by a UE, in accordance with various aspects of the present disclosure. Example process 800 is an example where the UE (e.g., UE 120 and/or the like) performs operations associated with deriving CSI using a subset of configured CSI-RS resources.

As shown in FIG. 8, in some aspects, process 800 may include receiving a configuration that indicates a set of CSI-RSs to be measured by the UE for deriving CSI, one or more time domain resources for which the UE is to derive the CSI, and a time domain resource for transmission of a CSI report that includes the CSI, wherein the one or more time domain resources for which the UE is to derive the CSI occur after the time domain resource for transmission of the CSI report (block 810). For example, the UE (e.g., using receive processor 258, controller/processor 280, memory 282, and/or the like) may receive a configuration that indicates a set of CSI-RSs to be measured by the UE for deriving CSI, one or more time domain resources for which the UE is to derive the CSI, and a time domain resource for transmission of a CSI report that includes the CSI, as described above. In some aspects, the one or more time domain resources for which the UE is to derive the CSI occur after the time domain resource for transmission of the CSI report. In some aspects, the one or more time domain resources are one or more slots, one or more mini-slots, one or more symbols, one or more sets of symbols, one or more subframes, or the like. Similarly, the time domain resource for transmission of the CSI report may be a slot, a mini-slot, a symbol, a set of symbols, a subframe, or the like.

As further shown in FIG. 8, in some aspects, process 800 may include determining that the UE cannot measure a first subset of CSI-RSs included in the set of CSI-RSs (block 820). For example, the UE (e.g., using receive processor 258, transmit processor 264, controller/processor 280, memory 282, and/or the like) may determine that the UE cannot measure a first subset of CSI-RSs included in the set of CSI-RSs, as described above.

As further shown in FIG. 8, in some aspects, process 800 may include deriving one or more parameters for the CSI report based at least in part on measuring a second subset of CSI-RSs included in the set of CSI-RSs, wherein the second subset of CSI-RSs excludes the first subset of CSI-RSs (block 830). For example, the UE (e.g., using receive processor 258, transmit processor 264, controller/processor 280, memory 282, and/or the like) may derive one or more parameters for the CSI report based at least in part on measuring a second subset of CSI-RSs included in the set of CSI-RSs, as described above. In some aspects, the second subset of CSI-RSs excludes the first subset of CSI-RSs.

As further shown in FIG. 8, in some aspects, process 800 may include transmitting the CSI report, including the one or more parameters, in the time domain resource for transmission of the CSI report (block 840). For example, the UE (e.g., using transmit processor 264, controller/processor 280, memory 282, and/or the like) may transmit the CSI report, including the one or more parameters, in the time domain resource for transmission of the CSI report, as described above.

Process 800 may include additional aspects, such as any single aspect or any combination of aspects described below and/or in connection with one or more other processes described elsewhere herein.

In a first aspect, the CSI report is transmitted based at least in part on a determination that the second subset of CSI-RSs includes a threshold number of CSI-RSs.

In a second aspect, alone or in combination with the first aspect, the threshold number is based at least in part on a capability of the UE.

In a third aspect, alone or in combination with one or more of the first and second aspects, the threshold number is two and represents one of a minimum number of OFDM symbols that include CSI-RSs or a minimum number of CSI-RS resources.

In a fourth aspect, alone or in combination with one or more of the first through third aspects, the OFDM symbols are not consecutive.

In a fifth aspect, alone or in combination with one or more of the first through fourth aspects, the CSI report is dropped based at least in part on a determination that the second subset of CSI-RSs does not include a threshold number of CSI-RSs.

In a sixth aspect, alone or in combination with one or more of the first through fifth aspects, process 800 includes refraining from updating the CSI report based at least in part on a determination that the second subset of CSI-RSs does not include a threshold number of CSI-RSs.

In a seventh aspect, alone or in combination with one or more of the first through sixth aspects, the determination that the UE cannot measure the first subset of CSI-RSs is based at least in part on at least one of: a timing of at least one CSI-RS, of the first subset of CSI-RSs, relative to the time domain resource for transmission of the CSI report; a collision between at least one CSI-RS, of the first subset of CSI-RSs, and another communication; a configuration of a symbol of at least one CSI-RS, of the first subset of CSI-RSs, as an uplink symbol; puncturing of at least one CSI-RS of the first subset of CSI-RSs; configuration or reconfiguration of the CSI report; activation of a serving cell; a change in bandwidth part; activation of semi-persistent CSI; a DRX cycle configuration; or a combination thereof.

In an eighth aspect, alone or in combination with one or more of the first through seventh aspects, the set of CSI-RSs, to be measured by the UE for deriving CSI, span across multiple non-adjacent symbols associated with a single CSI-RS transmission occasion.

In a ninth aspect, alone or in combination with one or more of the first through eighth aspects, the CSI report is transmitted based at least in part on a determination that the second subset of CSI-RSs includes CSI-RSs in a threshold number of non-adjacent symbols.

In a tenth aspect, alone or in combination with one or more of the first through ninth aspects, the set of CSI-RSs, to be measured by the UE for deriving CSI, includes multiple one-symbol CSI-RS transmission occasions that occur in non-adjacent symbols.

In an eleventh aspect, alone or in combination with one or more of the first through tenth aspects, the CSI report is transmitted based at least in part on a determination that the second subset of CSI-RSs includes a threshold number of one-symbol CSI-RS transmission occasions.

In a twelfth aspect, alone or in combination with one or more of the first through eleventh aspects, process 800 includes detecting at least one of a CSI report configuration, a CSI report reconfiguration, a serving cell activation, a bandwidth part change, or an activation of semi-persistent CSI; and transmitting the CSI report based at least in part on the detection and further based at least in part on a determination that the second subset of CSI-RSs includes a threshold number of CSI-RSs that are received within a CSI reference resource interval associated with the CSI report.

In a thirteenth aspect, alone or in combination with one or more of the first through twelfth aspects, the CSI report is transmitted based at least in part on a determination that the second subset of CSI-RSs includes a threshold number of CSI-RSs that are received during a DRX active time within a CSI reference resource interval associated with the CSI report.

In a fourteenth aspect, alone or in combination with one or more of the first through thirteenth aspects, the CSI report is transmitted based at least in part on a determination that the second subset of CSI-RSs includes a threshold number of latest-occurring CSI-RSs that occur during a DRX active time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration that indicates a set of channel state information reference signals (CSI-RSs) to be measured by the UE for deriving channel state information (CSI), one or more time domain resources for which the UE is to derive the CSI, and a time domain resource for transmission of a CSI report that includes the CSI, wherein the one or more time domain resources for which the UE is to derive the CSI occur after the time domain resource for the transmission of the CSI report;
   determining that the UE cannot measure a first subset of CSI-RSs included in the set of CSI-RSs based at least in part on a symbol of the first subset of CSI-RSs being received less than a threshold quantity of symbols before the transmission of the CSI report;
   deriving one or more parameters for the CSI report based at least in part on measuring a second subset of CSI-RSs included in the set of CSI-RSs, wherein the second subset of CSI-RSs excludes the first subset of CSI-RSs; and
   transmitting the CSI report, including the one or more parameters, in the time domain resource for the transmission of the CSI report.

2. The method of claim 1, wherein the CSI report is transmitted based at least in part on a determination that the second subset of CSI-RSs includes a threshold quantity of CSI-RSs.

3. The method of claim 2, wherein the threshold quantity of CSI-RSs is based at least in part on a capability of the UE.

4. The method of claim 2, wherein the threshold quantity of CSI-RSs is two and represents one of a minimum quantity of orthogonal frequency division multiplexing (OFDM) symbols that include CSI-RSs or a minimum quantity of CSI-RS resources.

5. The method of claim 4, wherein the OFDM symbols are not consecutive.

6. The method of claim 1, wherein the CSI report is dropped based at least in part on a determination that the second subset of CSI-RSs does not include a threshold quantity of CSI-RSs.

7. The method of claim 1, further comprising refraining from updating the CSI report based at least in part on a determination that the second subset of CSI-RSs does not include a threshold quantity of CSI-RSs.

8. The method of claim 1, further comprising:
   determining that the UE cannot measure the first subset of CSI-RSs based at least in part on at least one of:
   a collision between at least one CSI-RS, of the first subset of CSI-RSs, and another communication,
   puncturing of at least one CSI-RS of the first subset of CSI-RSs,
   configuration or reconfiguration of the CSI report,
   activation of a serving cell,
   a change in bandwidth part,
   activation of semi-persistent CSI, or
   a discontinuous reception (DRX) cycle configuration.

9. The method of claim 1, wherein the set of CSI-RSs, to be measured by the UE for deriving CSI, span across multiple non-adjacent symbols associated with a single CSI-RS transmission occasion.

10. The method of claim 9, wherein the CSI report is transmitted based at least in part on a determination that the second subset of CSI-RSs includes CSI-RSs in a threshold quantity of non-adjacent symbols.

11. The method of claim 1, wherein the set of CSI-RSs, to be measured by the UE for deriving CSI, includes multiple one-symbol CSI-RS transmission occasions that occur in non-adjacent symbols.

12. The method of claim 11, wherein the CSI report is transmitted based at least in part on a determination that the second subset of CSI-RSs includes a threshold quantity of one-symbol CSI-RS transmission occasions.

13. The method of claim 1, further comprising:
   detecting at least one of a CSI report configuration, a CSI report reconfiguration, a serving cell activation, a bandwidth part change, or an activation of semi-persistent CSI; and
   transmitting the CSI report based at least in part on the detection and further based at least in part on a determination that the second subset of CSI-RSs includes a threshold quantity of CSI-RSs that are received within a CSI reference resource interval associated with the CSI report.

14. The method of claim 1, wherein the CSI report is transmitted based at least in part on a determination that the second subset of CSI-RSs includes a threshold quantity of CSI-RSs that are received during a discontinuous reception (DRX) active time within a CSI reference resource interval associated with the CSI report.

15. The method of claim 1, wherein the CSI report is transmitted based at least in part on a determination that the second subset of CSI-RSs includes a threshold quantity of latest-occurring CSI-RSs that occur during a discontinuous reception (DRX) active time.

16. A user equipment (UE) for wireless communication, comprising:
   memory; and
   one or more processors coupled to the memory, the one or more processors configured to:
   receive a configuration that indicates a set of channel state information reference signals (CSI-RSs) to be measured by the UE for deriving channel state information (CSI), one or more time domain resources for which the UE is to derive the CSI, and a time domain resource for transmission of a CSI report that includes the CSI, wherein the one or more time domain resources for which the UE is to derive the CSI occur after the time domain resource for the transmission of the CSI report;
   determine that the UE cannot measure a first subset of CSI-RSs included in the set of CSI-RSs based at least in part on a symbol of the first subset of CSI-RSs being received less than a threshold quantity of symbols before the transmission of the CSI report;

derive one or more parameters for the CSI report based at least in part on measuring a second subset of CSI-RSs included in the set of CSI-RSs, wherein the second subset of CSI-RSs excludes the first subset of CSI-RSs; and transmit the CSI report, including the one or more parameters, in the time domain resource for the transmission of the CSI report.

17. The UE of claim 16, wherein the CSI report is transmitted based at least in part on a determination that the second subset of CSI-RSs includes a threshold quantity of CSI-RSs.

18. The UE of claim 17, wherein the threshold quantity of CSI-RSs is based at least in part on a capability of the UE.

19. The UE of claim 17, wherein the threshold quantity of CSI-RSs is two and represents one of a minimum quantity of orthogonal frequency division multiplexing (OFDM) symbols that include CSI-RSs or a minimum quantity of CSI-RS resources.

20. The UE of claim 19, wherein the OFDM symbols are not consecutive.

21. The UE of claim 16, wherein the CSI report is dropped based at least in part on a determination that the second subset of CSI-RSs does not include a threshold quantity of CSI-RSs.

22. The UE of claim 16, wherein the one or more processors are further configured to refrain from updating the CSI report based at least in part on a determination that the second subset of CSI-RSs does not include a threshold quantity of CSI-RSs.

23. The UE of claim 16, wherein the one or more processors are configured to:

determine that the UE cannot measure the first subset of CSI-RSs based at least in part on at least one of:
  a collision between at least one CSI-RS, of the first subset of CSI-RSs, and another communication,
  puncturing of at least one CSI-RS of the first subset of CSI-RSs,
  configuration or reconfiguration of the CSI report,
  activation of a serving cell,
  a change in bandwidth part,
  activation of semi-persistent CSI, or
  a discontinuous reception (DRX) cycle configuration.

24. The UE of claim 16, wherein the set of CSI-RSs, to be measured by the UE for deriving CSI, span across multiple non-adjacent symbols associated with a single CSI-RS transmission occasion, and wherein the CSI report is transmitted based at least in part on a determination that the second subset of CSI-RSs includes CSI-RSs in a threshold quantity of non-adjacent symbols.

25. The UE of claim 16, wherein the set of CSI-RSs, to be measured by the UE for deriving CSI, includes multiple one-symbol CSI-RS transmission occasions that occur in non-adjacent symbols, and wherein the CSI report is transmitted based at least in part on a determination that the second subset of CSI-RSs includes a threshold quantity of one-symbol CSI-RS transmission occasions.

26. The UE of claim 16, wherein the one or more processors are further configured to:

detect at least one of a CSI report configuration, a CSI report reconfiguration, a serving cell activation, a bandwidth part change, or an activation of semi-persistent CSI; and transmit the CSI report based at least in part on the detection and further based at least in part on a determination that the second subset of CSI-RSs includes a threshold quantity of CSI-RSs that are received within a CSI reference resource interval associated with the CSI report.

27. The UE of claim 16, wherein the CSI report is transmitted based at least in part on a determination that the second subset of CSI-RSs includes a threshold quantity of CSI-RSs that are received during a discontinuous reception (DRX) active time within a CSI reference resource interval associated with the CSI report.

28. The UE of claim 16, wherein the CSI report is transmitted based at least in part on a determination that the second subset of CSI-RSs includes a threshold quantity of latest-occurring CSI-RSs that occur during a discontinuous reception (DRX) active time.

29. A non-transitory computer-readable medium storing one or more instructions for wireless communication that, when executed by one or more processors of a user equipment (UE), cause the UE to:

receive a configuration that indicates a set of channel state information reference signals (CSI-RSs) to be measured by the UE for deriving channel state information (CSI), one or more time domain resources for which the UE is to derive the CSI, and a time domain resource for transmission of a CSI report that includes the CSI, wherein the one or more time domain resources for which the UE is to derive the CSI occur after the time domain resource for the transmission of the CSI report;

determine that the UE cannot measure a first subset of CSI-RSs included in the set of CSI-RSs based at least in part on a symbol of the first subset of CSI-RSs being received less than a threshold quantity of symbols before the transmission of the CSI report;

derive one or more parameters for the CSI report based at least in part on measuring a second subset of CSI-RSs included in the set of CSI-RSs, wherein the second subset of CSI-RSs excludes the first subset of CSI-RSs; and transmit the CSI report, including the one or more parameters, in the time domain resource for the transmission of the CSI report.

30. An apparatus for wireless communication, comprising:

means for receiving a configuration that indicates a set of channel state information reference signals (CSI-RSs) to be measured by the apparatus for deriving channel state information (CSI), one or more time domain resources for which the apparatus is to derive the CSI, and a time domain resource for transmission of a CSI report that includes the CSI, wherein the one or more time domain resources for which the apparatus is to derive the CSI occur after the time domain resource for the transmission of the CSI report;

means for determining that the apparatus cannot measure a first subset of CSI-RSs included in the set of CSI-RSs based at least in part on a symbol of the first subset of CSI-RSs being received less than a threshold quantity of symbols before the transmission of the CSI report;

means for deriving one or more parameters for the CSI report based at least in part on measuring a second subset of CSI-RSs included in the set of CSI-RSs, wherein the second subset of CSI-RSs excludes the first subset of CSI-RSs; and means for transmitting the CSI report, including the one or more parameters, in the time domain resource for the transmission of the CSI report.

* * * * *